United States Patent Office
3,006,939
Patented Oct. 31, 1961

3,006,939
PRODUCTION OF COMPOUNDS OF THE BETA-CYCLOGERANYLIDENE SERIES
Horst Pommer and Wilhelm Sarnecki, Ludwigshafen (Rhine), Germany, assignors to Badische Anilin- & Soda-Fabrik Aktiengesellschaft, Ludwigshafen (Rhine), Germany
No Drawing. Filed Mar. 10, 1959, Ser. No. 798,344
Claims priority, application Germany Jan. 17, 1957
15 Claims. (Cl. 260—413)

This invention relates to the production of compounds of the beta-cyclogeranylidene series with the aid of phosphines, more particularly to the production of carotenoids or of compounds of the vitamin A series, such as vitamin A acid, its salts and esters.

This application is a continuation-in-part of our copending application Serial No. 708,761, filed January 14, 1958.

In the last twenty years, many methods have been disclosed for the production of compounds which contain the beta-cyclogeranylidene radical (I):

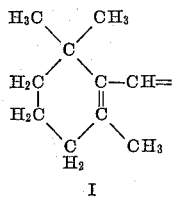

I

Interest in research on the synthesis of compounds of the cyclogeranylidene series is not surprising because many natural substances, which play a considerable part in human nutrition or in physiology, contain this radical (I), as for example many carotenoids, such as beta-carotene and vitamin A.

In prior methods (for example, see O. Isler, Chimia, volume 4 (1950), page 116 et seq.; H. H. Inhoffen and F. Bohlmann, Fortschr. chem. Forschung 1 (1949), pages 175 to 210; F. Bohlmann, Agnew. Chem. 62 (1950), pages 4 to 7; E. Vogel and H. Knobloch, "Chemie und Technik der Vitamine," 3rd edition, (1950), volume 1, pages 18 to 150; J. S. N. Jones, Chem. Prod., Chem. News 13 (1950), page 206; J. G. Baxter, Fortschritte der Chemie org. Naturstoffe, Springer-Verlag, Vienna, volume 9 (1952), page 78; H. H. Inhoffen and H. Siemer, ibid., pages 1 to 77; H. O. Huisman and collaborators, Rec. des Trav. chim. des Pays-Bas, volume 71 (1952), page 911; N. A. Milas "The Vitamins," volume 1, Academic Press Soc. Publishers, New York (1954), pages 4 to 58; O. Isler, Angew. Chem. (1956), pages 547 to 553 and O. Isler and M. Montavon, Chimia 12 (1958), page 1) either the pure beta-isomers of cyclocitral (II) or of ionone (III) or compounds containing the radicals IV or V, are used as initial materials for the synthesis of compounds of the cyclogeranylidene series,

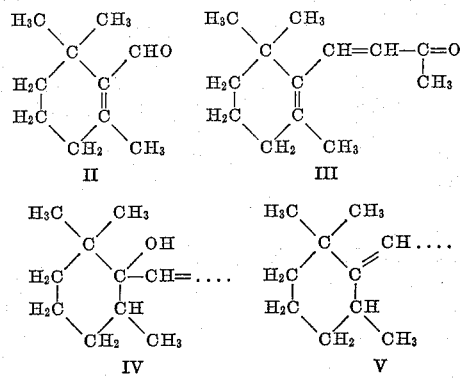

Experience has taught that beta-cyclocitral (II) is not an economically useful initial material for the synthesis of carotenoids (the term carotenoids being here and hereinafter understood as including also vitamin A and its functional derivatives) or the preliminary stages of the same. Although it is true that syntheses of compounds of the types IV and V have often been described, they are too troublesome for technical methods and have therefore not been used in practice.

It can thus be asserted in recapitulation that hitherto the preferred initial material for the synthesis of compounds of the beta-cyclogeranylidene series is beta-ionone (III) which is readily accessible technically and is prepared in large amounts as a perfume (see for example the technical synthesis of vitamin A and of beta-carotene, comprehensively reviewed by O. Isler in Zeitschrift für Angewandte Chemie 68 (1956), page 547).

A process for the production of vitamin A acid is described in the U.S. patent application Ser. No. 519,684, filed on July 1, 1955, and still pending, by Horst Pommer which is certainly simpler than those previously known, but it still also contains an organometallic condensation stage. In more recent times a few simple methods have become known in which organometallic reactions, which are often difficult to control technically, are avoided and the last stage consists of a condensation of suitable aldehydes and ketones with an ylide of phosphorus (cf. U.S. patent applications Ser. No. 534,156, filed September 13, 1955, and still pending, by Georg Wittig and Horst Pommer; Ser. No. 559,516, filed January 17, 1956, by Horst Pommer and Georg Wittig; and now issued as U.S. Patent 2,917,524; and Ser. No. 600,404, filed July 27, 1956, by Horst Pommer and Georg Wittig, and now issued as U.S. Patent 2,917,523).

The object of this invention is a particularly advantageous process for the production of compounds having in their molecule the radical of beta-cyclogeranylidene. Among these compounds is encompassed vitamin A acid, its salts and its esters. A further object of the invention is the production of biologically-active dyestuffs for foodstuffs.

According to this invention the compounds having the radical of beta-cyclogeranylidene are obtained when a compound of the general formula

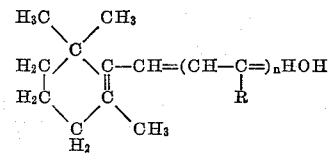

in which $n$ represents 0, 1, 2, 3 or 4 and R represents hydrogen (H) or methyl ($CH_3$) is reacted with a triarylphosphine and a proton donor or a hydrosalt of a triarylphosphine on the one hand and with an oxo compound, in conjunction with a proton acceptor on the other hand.

Compounds which fall with the general formula given above are, for example, beta-cyclogeraniol (VI), beta-ionol (VII), beta-ionylidene ethanol (VIII), 8-[2′,6′,6′-tri - methylcyclohexene - (1′) - yl - (1′)] - 6 - methyloctatriene-(3,5,7)-ol-(2) (IX), and vitamin A alcohol (X). Said compounds have the formulae

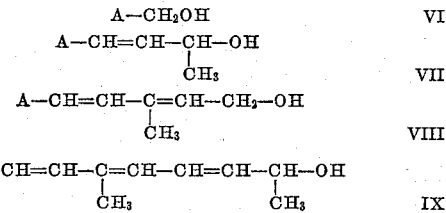

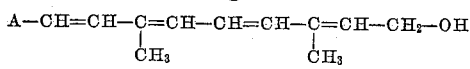

where A represents the radical

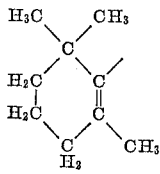

In these compounds, R is methyl in odd numbered group

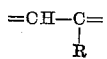

and R is H in even numbered group

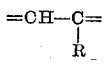

when counted beginning from A.

As an illustration, starting from beta-ionol it is possible in a single stage to obtain crystalline vitamin A acid or its salts by reacting beta-ionol (VII) in the presence of an organic solvent or solvent mixture with a hydrohalide of a triarylphosphine, preferably with triphenyl phosphine hydrochloride or hydrobromide, and adding to the beta-ionyl-arylphosphonium halide which is probably formed, about an equivalent amount of 4-methylhexadiene-(2,4)-al-(1)-acid-(6), and then about two equivalents of an acid-binding agent. By acidifying, the vitamin A acid is set free and occurs in crystalline form.

Triphenyl phosphine is preferred according to the process of the present invention because at present it is obtainable more cheaply than other triaryl phosphines. Triaryl phosphines containing toluene, xylene or other aryl radicals, however, are also suitable. Tritolylphosphine and trixylylphosphine can be called tri(lower alkyl substituted) aryl phosphines. The term triarylphosphine is intended to include all compounds suitable for the reaction in the molecule of which three aromatic rings, preferably single rings, are attached to one phosphorus atom.

As proton donors there are eminently suitable strong inorganic acids, especially the halogen hydracids and also those oxygen acids of sulfur and phosphorus which do not exert an oxidizing or reducing action under the reaction conditions. Moreover, all acids are suitable which form with triarylphosphines, salts of the type:

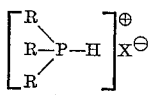

in which R represents identical or different aromatic radicals, X⊖ represents the radical of an inorganic or strong organic acid, for example trichloracetic acid or benzenesulfonic acid. The expression proton donors includes all compounds which give off protons and which an expert after becoming acquainted with this patent description deems to be suitable for the process according to this invention.

As proton acceptors we include all substances which are acid-binding agents or act as acid-binding agents; to these belong inorganic bases such as alkali metal hydroxides, alkaline earth metal hydroxides, alkali and alkaline earth metal amides and ammonia; among organic bases there are suitable for example strongly basic amines, such as piperidine or diethylamine; similarly, alkali and alkaline earth metal alcoholates, alkali and alkaline earth metal ketone enolates, and in many cases also organometallic compounds, such as lithium methyl, sodium methyl, phenyl sodium, phenyl lithium, butyl lithium, sodium acetylide, indene potassium and Grignard compounds, such as ethyl magnesium bromide, are also suitable. Alkali metals, such as sodium, potassium and lithium, alkaline earth metals, such as calcium and magnesium, are the preferred metals for the formation of acid-binding agents. The alcoholates may be derivatives of lower aliphatic alcohols such as methanol, ethanol, propanol, isopropanol, the butanols and amyl alcohol. It is emphasized that these statements are for the purpose of illustration only and not by way of limitation. The acid-binding agents may split off hydrogen halide, for example from beta-ionyl-triaryl-phosphonium halide.

Oxo compounds suitable for the process according to the present invention are compounds which contain in the molecule at least once a carbonyl group. The term carbonyl group is to be understood as the group O=C< to which are attached, each to a carbon atom, two organic radicals or a hydrogen atom and an organic radical. Compounds which satisfy this definition are aliphatic and aromatic aldehydes and ketones and formic acid esters.

As examples of oxo compounds suitable for the reaction there may be mentioned the following aldehydes and ketones: formaldehyde, acetaldehyde, propionaldehyde, butyraldehyde, isobutyraldehyde, acrolein, alpha-methyl-acrolein, crotonaldehyde, hexadienal, octatrienal, benzaldehyde, cinnamaldehyde, phenylacetaldehyde, acetone, butyrone, methyl ethyl ketone, cyclocitral, citral, glyoxylic acid, glyoxylic acid esters, glyoxal, glycol aldehyde, etherified or esterified glycol aldehydes, acetoacetic acid ester, oxomalonic esters, oxalacetic acid esters, phenylpentadienal, beta-alkoxy-acroleins, for example beta-ethoxyacrolein and alpha - methyl - beta - ethoxyacrolein, alpha - methyl - beta - acetoxyacrolein, alpha-methyl-beta-chloroacrolein, vinyl methyl ketone, beta-chlorovinyl methyl ketone, beta-methoxy-vinyl methyl ketone, chloroacetaldehyde, beta-formyl-acrylic acid, beta-formylacrylic acid esters, beta-formyl-crotonic acid esters, propargyl aldehyde, butinone, 3-methyl-butene-(2)-al-(4), 3-methyl-butene-(2)-al-(4)-ol-(1), its ethers, its esters, 1-carboxy-3-methyl-butene-(2)-al-(4) and its esters, N,N-dialkyl-1-amino-3-methyl-butene-(2)-al-(4), 4,4-dihydroxyethyl-pentene-(3)-al-(1), 4-acetoxypentene-(3)-al-(1), maleic dialdehyde, acetylene dialdehyde, 5-acetoxy-4-methyl-pentadiene-(2,4)-al-(1), 5-ethoxy - 4 - methyl-pentadiene-(2,4)-al-(1), 5-carboxy-4-methyl-pentadiene-(2,4)-al-(1), 5-carbalkoxy-4-methyl-pentadiene-(2,4)-al-(1), 5 - methoxy-4-methyl-pentadiene-(2,4)-al-(1), 5-carbmethoxy-4-methyl-pentadiene-(2,4)-al-(1), 6-methoxy-4-methyl-pentadiene-(2,4)-al-(1), 6 - acetoxy - 4 - methyl - pentadiene-(2,4)-al-(1), 4-methyl-hexadiene-(2,4)-al-(1), 4-methyl-hexadiene-(2,4)-al-(1)-acid-(6) and its esters, 4-methyl-hexadiene-(2,4)-al-(1), 7-carboxy-2,6-dimethyl-heptatriene-(2,4,6)-al-(1), 7-carbalkoxy-2,6-dimethyl-heptatriene-(2,4,6)-al-(1), 6 - dimethylamino - 4 - methyl - hexadiene-(2,4)-al-(1), 7-ethoxy - 4 - methyl-heptatriene-(2,4,6)-al-(1), 7-acetoxy-4-methyl-heptatriene-(2,4,6)-al-(1), 7-carboxy-4-methyl-heptatriene-(2,4,6)-al-(1), 7-carbethoxy-4-methyl-heptatriene-(2,4,6)-al-(1), 4 - methyl - octatrienal, 2,7 - dimethyl-octadiene-(2,6)-ine-(4)-dial-(1,8), 2,7 - dimethyl-octatriene-(2,4,6)-dial-(1,8), 8-alkoxy-2,6-dimethyl-octatriene-(2,4,6)-al-(1), 9-carboxy-4,8-dimethyl-nonatetraene-(2,4,6,8)-al-(1), 9-carbalkoxy-4,8-dimethyl-nonatetraene-(2,4,6,8)-al-(1), 4,8-dimethyl-decatetraenal, 9-carboxy-4,9-dimethyl - nonatetraene-(2,4,6,8)-al-(1), 11-carboxy - 2,5,10 - trimethyl-undecapentaene-(2,4,6,8,10)-al-(1), 13-carboxy-4,8,12-trimethyl-tridecahexaene-(2,4,6,8,10,12)-al-(1), 13-carboxy-4,9,13-trimethyl-tridecahexaene-(2,4,6,8,10,12)-al-(1), 4,8 - dimethyl-dodecatetraene-(2,4,8,10)-ine-(6)-dial-(1,12) and 4,8 - dimethyl-dodecapentaene-(2,4,6,8,10)-dial-(1,12).

The esters of formic acid may also be reacted with excellent yields according to this invention, especially those derived from aliphatic alcohols with from 1 to 5 carbon atoms.

As the above list (which is merely for purpose of illustration and is not intended to be limitative) indicates, the carbonyl groups may bear a great variety of substituents. They may be not only saturated or unsaturated hydrocarbon radicals, such as aliphatic, cycloaliphatic, aliphatic-cycloaliphatic, cycloaliphatic-aliphatic, aromatic, aliphatic-aromatic and aromatic-aliphatic radicals, but also radicals containing oxygen, sulfur, halogen, nitrogen and/or other atoms, such as one, two or more ester, ether, thio-ether, hydroxy, carboxylic acid, carboxylic acid amide and/or nitro groups. To the expert it is obvious that the substituents on the carbonyl groups must not contain radicals which would interfere with the reaction, and it is also obvious that the oxo compounds must not be of such high molecular weight that they do not dissolve sufficiently under the reaction conditions.

It may be said quite generally that for reaction with the beta-cyclogeranylidene derivatives according to the invention, those aldehydes and dialdehydes yield preferred products which contain at least one unsaturated carbon-carbon linkage in conjugation to the carbonyl double linkage and, when they are branched those which have preferably methyl radicals or ethyl radicals as side radicals. The terminal groups of the preferred aldehydes can be hydrocarbon radicals, or hydroxyl, ether, carboxylic, ester or amino groups. The number of unsaturated carbon-carbon linkages in the preferred aldehydes and dialdehydes should preferably not exceed 8. The total number of carbon atoms in the oxo compounds, excluding the carbon atoms of any ether, ester or amino radicals present, should preferably not exceed 30.

The reactions are carried out in organic solvents which are liquid under the reaction conditions. A suitable solvent is one which does not react with the reactants or the reaction products during the reaction and which is called hereinafter an inert solvent. Especially suitable is a polar solvent; weakly polar or non-polar solvents, however, may also be used, such as ethers, as for example diethyl ether, dioxane, tetrahydrofurane, 2,5-dimethyltetrahydrofurane, aliphatic, cycloaliphatic or aromatic hydrocarbons, such as iso-octane, cyclohexane, cyclo-octane, benzene, toluene, xylene, or nitrobenzene or mixtures. When using the last-mentioned solvents, the reaction speed is merely somewhat reduced. Alcohols, such as aliphatic or aromatic-aliphatic alcohols, are also operable, for example, methanol, ethanol, isopropanol, the butanols and benzyl alcohol. Strongly polar solvents which are preferred are, for example, dimethylformamide, acetonitrile, N-methylpyrrolidone, ethyl acetate, nitrobenzene, and methanol. Mixtures of different solvents may also be used.

Many other organic liquids may also be used as reaction media. It is not necessary to enumerate these for the expert. The amount of solvent is not of importance for carrying out the new process because from high down to low concentration very good results are achieved. In the practice of our invention the presence of water does not generally interfere with the course of the reaction.

The water formed during this reaction can be removed, if desired, with a tractive agent, such as benzene or 2,5-dimethyltetrahydrofurane, by azeotropic distillation, or by distillation under reduced pressure. It is preferable, however, to avoid temperatures above 80° C. because otherwise the yield may suffer. This does not exclude the possibility of obtaining good yields at high temperatures. Generally the reaction temperatures may be varied within wide limits, for example from −50° C. to +100° C., and are dependent inter alia on the melting and boiling points of the solvents. In general it is advantageous to work at temperatures of about 0° C. to +10° C. The reaction can be promoted by stirring, for example half an hour to 2, 4 or more hours, or shaking.

The relative proportions of the initial materials, especially the ratio of the beta-cyclogeranylidene component to the triarylphosphine and to the proton donor or to the hydrosalt of a triarylphosphine, is advantageously chosen, for practical reasons, approximately stoichiometrical, and also the oxo compound to be reacted so that as little as possible of the reactants remain unused. "Stoichiometrical amounts" means equivalent amounts with respect to the reactive groups taking part in the reaction according to the assumed reaction mechanism taking place. It is also possible to exceed or fall below the equivalent, for example, by 20 to 30%.

When a dioxo compound is used and it is desired to react both oxo groups it is often advantageous to use the dioxo compound in a quantity below the stoichiometrical amount. The proton acceptors usually are also used in equivalent proportions, but often a multiple of the equivalent may be advantageous, for example when oxo carboxylic acids are used as one reaction component or when the proton donor is used in excess.

In some cases the yields may be improved by protecting the reaction mixture from access of air by a gas which is inert or slow to react such as nitrogen or argon.

It should be empasized that the invention is not limited to the choice of specific amounts of initial materials, specific triarylphosphines, specific solvents, temperatures or other details which can be established by an expert from the information given in this description without the exercise of inventive ingenuity. The statements in the present description, therefore, merely give some illustrations for purposes of explanation but the invention is not limited thereto.

In order to explain the reaction on which the present invention is based, but of which every detail of the reaction mechanism is not clarified, some characteristic reactions will be explained diagrammatically.

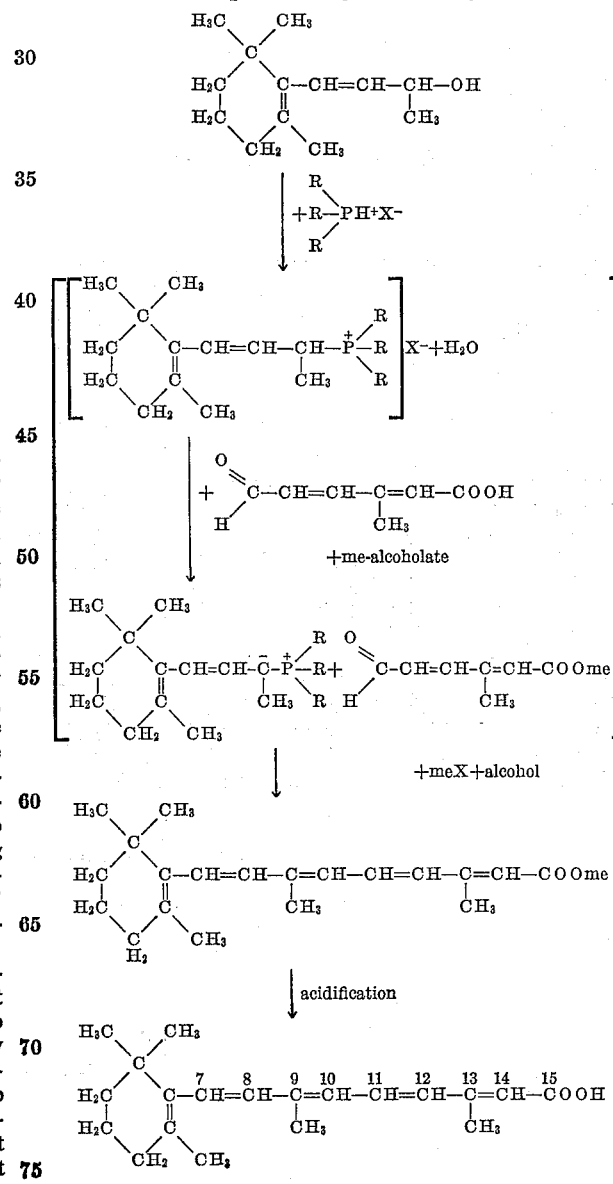

In the formulae, R may stand for identical or different aryl groups, X⁻ may stand for one equivalent of an anion, for example, halogen, such as iodine, preferably, however, for chlorine or bromine; me may stand for one equivalent of an alkali or alkaline earth metal. It is pointed out that the reaction scheme is based only on assumption. The intermediate stages which are inclined within brackets have not been isolated in the outlined process and, therefore, the assumption lacks absolute proof. Accordingly, a simplified scheme for the reaction scheduled above is shown hereinafter without the intermediate stages:

be evaporated, preferably at reduced pressure and while avoiding temperatures higher than 50° C. and then the dimethylformamide is added.

As another example, 4-(2',6',6'-trimethyl-cyclohexene-(1') - yl - (1'))-2-methyl-1-ethoxy-butadiene-(1,3) (XI), which can readily be converted by treatment with acids into 4-(2',6',6'-trimethylcyclohexene - (1') - yl - (1')) - 2-methyl-butene-(2)- aldehyde-(1) and constitutes a valuable perfume as well as the initial material for many carotenoid syntheses, including the synthesis of vitamin A and beta-carotene, can be recovered in excellent yields from beta-ionol (VII) and ethyl formate.

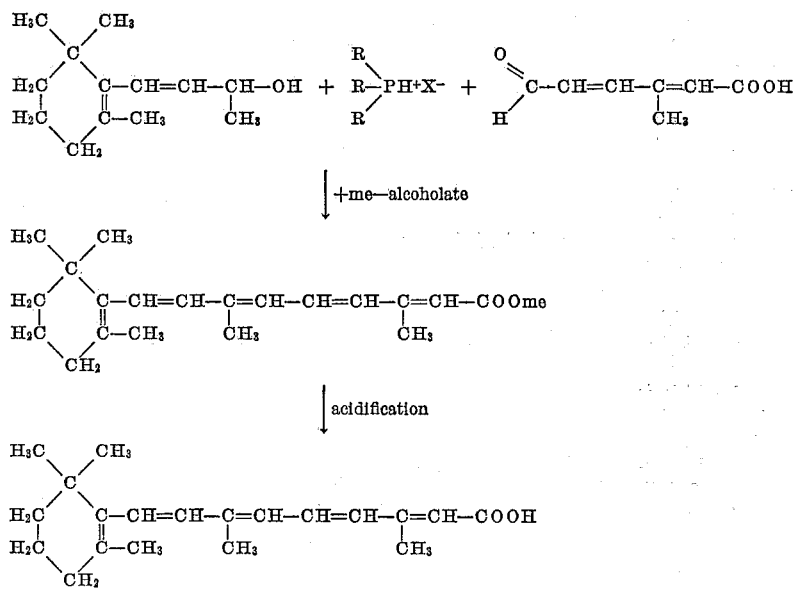

In this manner vitamin A acid is obtained from beta-ionol and 4-methyl-hexadiene-(2,4)-al-(1)-acid-(6).

When in the above outlined reaction about two equivalents of the acid-binding agent are provided for one equivalent of the phosphine compound, there are in general the best yields in an economical manner. The acid-binding agent, however, may also be used in excess, for example up to four equivalents to one equivalent of the phosphine compound.

The relative proportions of 4-methyl-hexadiene-(2,4)-al-(1)-acid-(6) on the one hand and beta-ionol and triaryl-phosphine on the other hand are preferably about equivalent so that as little as possible of the reactants remains unused. It is also possible however to exceed or fall below the equivalent, for example by 20 to 30%.

Dimethylformamide is especially suitable as a solvent for the further reaction of the beta-ionyl-aryl-phosphonium halide probably first obtained with 4-methyl-hexadiene-(2,4)-al-(1)-acid-(6) and acid-binding agent; the concentration in this case also may be varied within all limits which come into question in practice. If another solvent has been used for the previous stage, this may In the following diagrammatic reproductions, triphenylphosphine is always shown as the triarylphosphine, hydrochloric acid as the proton donor and sodium methylate as the proton acceptor, and dimethylformamide as the solvent, for the sake of simplicity.

In the formulae

stands for

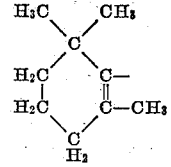

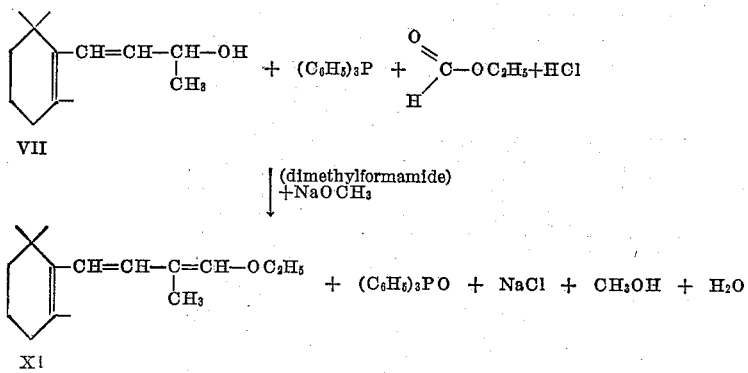

A valuable non-toxic vitamin A-active isoprenoid food dyestuff (XII) is obtained for example from VII and 9-carboxy-4,8-dimethyl-nonatetraene-(2,4,6,8)-al-(1).

pure trans compounds, which are often desirable, usually can readily be obtained by treatment of the stereomeric mixtures with isomerizing reagents, as for example mineral

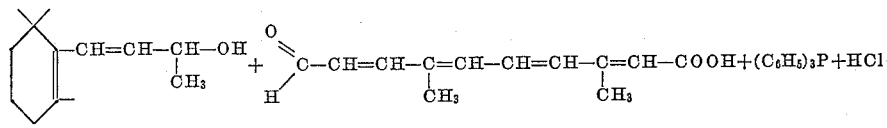

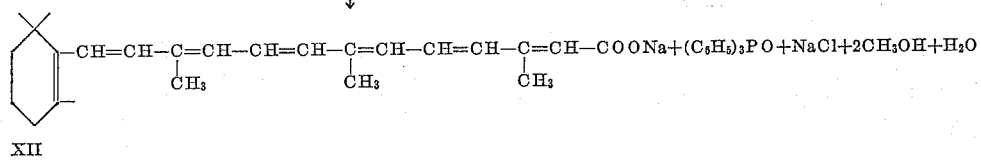

By reaction of 2 mols of the compound VII with 1 mol of 4,8-dimethyl-dodecapentaene-(2,4,6,8,10)-dial-(1,12) there is obtained beta-carotene (XIII) which is important as provitamin A and natural dyestuff.

acids or halogens such as iodine and also by irradiation with light of suitable wavelengths.

By the reaction of compound VIII with ethyl formate there is obtained the enol ether of the so-called beta-

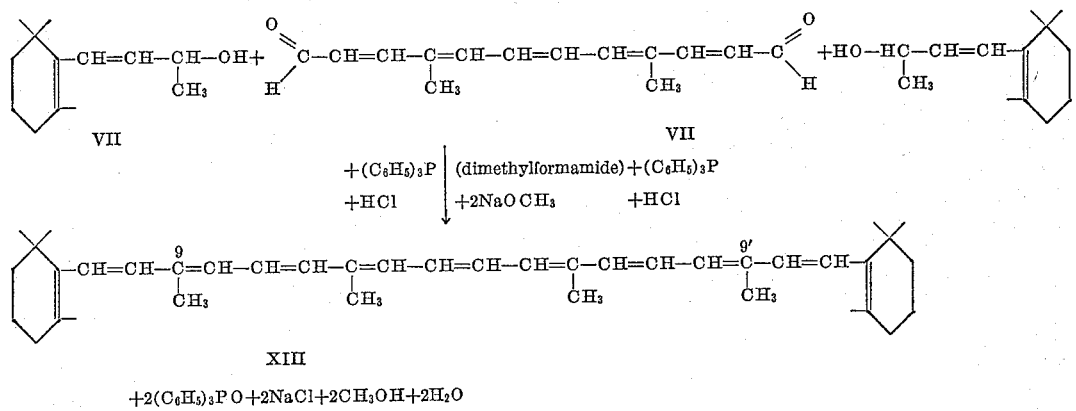

In almost all cases, in syntheses with compound VII as the initial material, there are at first obtained compounds which are not unitary in their stereochemical structure. A cis-trans isomerism forms at the linkage position (in position 9 of the beta-cyclogeranylidene system). The $C_{16}$-aldehyde, an important intermediate product of the beta-carotene synthesis according to O. Isler (see Angew. Chem. 68 (1956), page 547), 6-(2',6',6'-trimethyl-cyclohexene - (1') - yl - (1')) - 4 - methyl - 1 - ethoxyhexatriene-(1,3,5), (XIV).

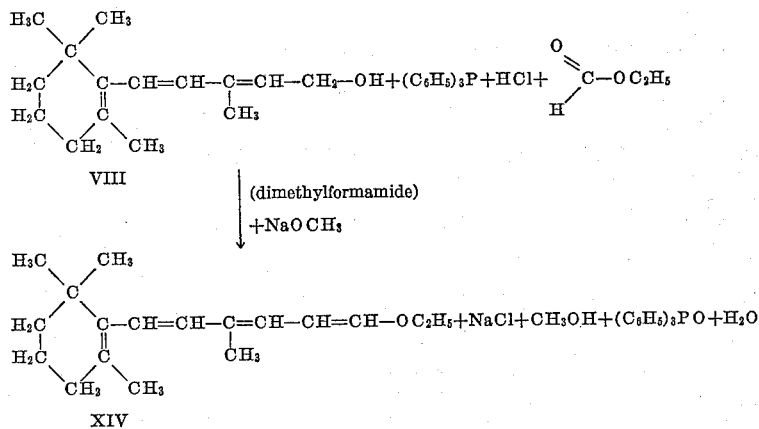

Beta-carotene (XIII) is obtained from one mol of the compound VIII and ½ mol of 2,7-dimethyl-octatriene-(2,4,6)-dial-(1,8) (XV) in excellent purity and yield.

tion or the separation of aryl-phosphine oxide formed as by-product by solvent extraction, by distribution between solvents or by chromatography, are dispensed with.

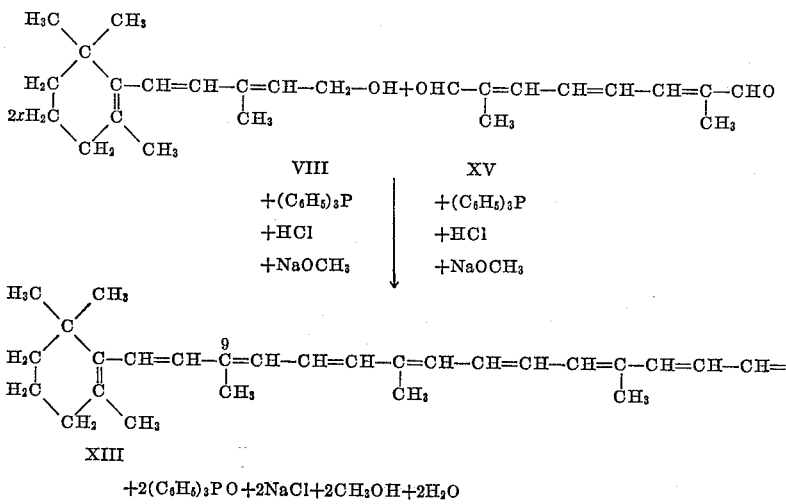

In syntheses with the compound VIII as initial material there are obtained in general compounds of the all-trans-beta-ionylidene-ethylidene series; if all isomerizing influences, such as light, acids or halogens, are avoided during the working up, there may also be isolated cis-compounds. The relatively stable compounds of the 9-cis-series are never formed in appreciable amounts.

The great technical and economical importance of the beta-cyclogeranylidene compounds has already been described herein and underlined by the choice of the compounds reproduced by formulae. A considerable enrichment of the art by the process according to this invention consists in the fact that with the aid of triarylphosphines, an alcohol with one or more double linkages can be converted by reaction with oxo compounds in a specially protective manner into modified compounds, above all vinylogous compounds with two or more conjugated double linkages. The compounds prepared according to this invention form in good yields and high purity. The initial materials are readily accessible.

An almost innumerable number of compounds of the beta-cyclogeranylidene series may now be prepared in a simple and economical process, including intermediate products, compounds of the vitamin A and beta-carotene series, pharmaceutical products and also isoprenoid dyestuffs.

The invention makes it possible to prepare many new colored compounds which are suitable for the coloring of foodstuffs because their structure resembles that of vitamin A, for example, the acid compound XII, its esters, and the compound with the anion

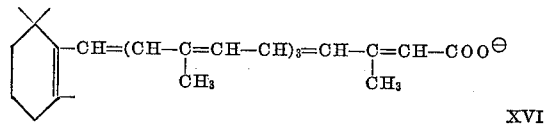

are valuable foodstuff colorants because their shade of color is stronger than that of vitamin A and weaker than that of beta-carotene.

The idea of our invention is illustrated particularly clearly in Examples 30 to 33 wherein the production of vitamin A acid is described. The advantage obtained by the technique described in these examples is that the troublesome conversion of beta-ionol into the beta-ionyl halide and the isolation of the intermediate substance which is assumed to be beta-ionyl-aryl-phosphonium halide becomes unnecessary. The vitamin A acid is obtained immediately in crystalline form and all troublesome purification operations, as for example high vacuum distilla- The yields of pure crystalline vitamin A acid, which occurs first as a mixture of stereo-isomers (a cis-linkage is situated between the C-atoms 9 and 10), are extremely good and therefore the new process represents a considerable technical advance because hitherto no process was known which permitted the synthesis of vitamin A acid in a simple way and with good yields. Vitamin A acid is a compound wth high physiological activity; it may either be used directly as a pharmaceutical substance or may be converted in known manner into vitamin A alcohol.

The following examples will further illustrate this invention but the invention is not restricted to these examples. The parts specified are parts by weight unless otherwise stated. Parts by volume stand in the same relation to parts by weight as the liter to the kilogram.

Example 1

80 parts of beta-cyclo-geraniol and 170 parts of triphenylphosphine hydrobromide are dissolved or suspended in 300 parts of dimethylformamide and stirred for 12 hours at room temperature. 100 parts of 7-carbethoxy-2,6-dimethylheptatriene-(2,4,6)-al-(1) are introduced into the resultant clear solution. The whole is stirred until a clear solution has been formed and then cooled to 0° C. At this temperature there is added a 30% solution of 28 parts of sodium methylate ($NaOCH_3$) in methanol. The whole is stirred for another 3 hours at room temperature, the reaction mixture poured onto ice and 10% of phosphoric acid and extracted with petroleum ether. The combined petroleum ether extracts are washed neutral with sodium bicarbonate solution and water and dried over sodium sulfate. After distilling off the petroleum ether, 160 parts of an oily residue remain behind. By fractional distillation there are obtained therefrom 70 parts of vitamin A acid ethyl ester of the boiling point (at 0.005 mm. Hg) of 148° to 153° C., $\lambda_{max}$ (methanol) 354 millimicrons, $\epsilon=37{,}000$.

Example 2

100 parts of beta-ionol are dissolved in 200 parts of dimethylformamide and, after the addition of 165 parts of triphenylphosphine hydrobromide, stirred for 7 hours at room temperature. Then 70 parts of 4-methyl-1-al-hexadiene-(2,4)-acid-(6) (melting point 177° C., white needles from water, $\lambda_{max}$ 274 millimicrons, $\epsilon=28{,}000$) are added to the now clear solution. 150 parts of isopropanol are added and the whole cooled to $-30°$ C. Into this solution, while stirring vigorously, 190 parts by volume of a 30% solution of sodium methylate in methanol are allowed to flow in. A vigorous exothermic reaction takes place and the temperature in the interior of the flask rises to +5° C. It is stirred for another 5 minutes and neutralized with 10% of sulfuric acid (until acid to Congo). After stirring for 2 hours at room temperature, the mass of vitamin A acid has crystallized out. It is sharply filtered off by suction and washed with a little ice-cold isopropanol. From the filtrate, a further small amount of mainly all-trans vitamin A acid crystallizes out upon the addition of water. The filter cake is suspended in 600 parts of water and stirred for 4 hours at room temperature; it is filtered by suction and the product washed with water. It is dried in vacuo at 40° to 50° C. and 115 parts of vitamin A acid are obtained. The melting point lies between 146° and 159° C. $\lambda_{max}$ (methanol) 347 to 349 millimicrons, $\epsilon=40,000$.

The mixture of the all-trans and mainly 9,10-cis vitamin A acid may se separated by fractional crystallization from ethanol.

All-trans vitamin A acid of the melting point 180° to 182° C., $\lambda_{max}$ (methanol) 351 to 352 millimicrons, $\epsilon=45,000$, and 9,10-cis vitamin A acid, which crystallized in the form of pale yellow fine needles collected into clusters, of the melting point 189° to 190° C., $\lambda_{max}$ 343 millimicrons, $\epsilon=36,500$.

*Example 3*

108 parts of beta-ionol and 165 parts of triphenylphosphine hydrochloride are suspended in 100 parts of acetonitrile. It is stirred for about an hour until all has dissolved, the heat of reaction being withdrawn so that the temperature of 50° C. is not exceeded. Then the acetonitrile is distilled off in vacuo at a maximum bath temperature of 50° C. and the frothy residue is dissolved in 130 parts of dimethylformamide. After adding 62.5 parts of 4-methyl-1-al-hexadiene-(2,4) acid-(6) (melting point 177° C., white needles, $\lambda_{max}$ in methanol 274 millimicrons, $\epsilon=28,000$), 200 parts of a 30% solution of sodium methylate in methanol are quickly added while cooling with ice. The reaction is strongly exothermic. It is stirred for 30 minutes, the methanol and dimethylformamide then partly distilled off in vacuo (maximum bath temperature 65° C.) to the residue there are added while stirring 80 parts of ethanol and 100 parts of 10% sulfuric acid, stirred for another 3 hours at 0° C. and the precipitated vitamin A acid then filtered off by suction. After washing with 30 parts of ice-cold methanol and about 300 parts of ice-water, the vitamin A acid is dried in vacuo at 40° C. The yield amounts to 100 parts.

*Example 4*

54 parts of beta-ionol and 80 parts of triphenylphosphine hydrobromide are suspended in 200 parts of 2,5-dimethyltetrahydrofurane and stirred for 6 hours. Then distillation is carried out with a separator until no further water passes over azeotropically, 50 parts of dimethyl formamide are added and 31 parts of 4-methyl-1-al-hexadiene-(2,4)-acid-(6) and, while cooling with ice and stirring, 100 parts of a 30% solution of sodium methylate in methanol is allowed to flow in. After 40 minutes, the bulk of the 2,5-dimethyltetrahydrofurane is distilled off in vacuo and about 500 parts of 10% sulfuric acid are added to the residue. The brown-yellow partly crystalline milky solution is extracted with ether, the deep yellow ether solution washed with water and shaken with a 5% ammonia solution. The brown ammonia solution is washed with ether and then acidified with 10% sulfuric acid, the vitamin A acid thereby being precipitated in crystalline form. It is isolated as in Example 3 and recrystallized from cyclohexane. The yield is 43 parts.

*Example 5*

100 parts of beta-ionol and 160 parts of triphenylphosphine hydrobromide are stirred for 12 hours in 200 parts of dimethylformamide. Then 80 parts of 4-methyl-1-al-hexadiene- (2,4)-acid-(6) ethyl ester (melting point 58° C., $\lambda_{max}$ 272 millimicrons, $\epsilon=31,000$) are added and the whole stirred until a clear solution has formed. It is cooled to −40° C. and 90 parts by volume of a 30% solution of sodium methylate in methanol are added drop by drop. It is stirred for another 2 hours at 0° C., and poured onto ice and 10% sulfuric acid. The mixture of the stereomeric vitamin A acid ethyl esters is isolated by extraction by means of petroleum ether. The pale yellow petroleum ether solution is washed with water, dried over sodium sulfate at −5° C. (for 12 hours), filtered and distilled. 90 parts of vitamin-A acid ethyl ester are obtained as a mixture of the stereoisomers. Boiling point (at 0.005 mm. Hg) 155° to 159° C., $\lambda_{max}$ 346 to 349 millimicrons, $\epsilon=38,000$.

*Example 6*

98 parts of beta-ionol and 165 parts of triphenylphosphine hydrobromide are suspended in 200 parts of dimethylformamide and stirred for 12 hours at room temperature. 60 parts of alpha-methyl-beta-ethoxyacrolein (German patent specification No. 1,031,777) are added and cooled to −10° C. While stirring vigorously, 100 parts by volume of a 30% solution of sodium methylate in methanol are quickly added. After stirring for another 4 hours at room temperature, it is poured onto ice and extracted with petroleum ether. The pale yellow petroleum ether solution is washed several times with water and dried for 12 hours over sodium sulfate at −5° C. The filtrate is filtered and distilled. 78 parts of 6-(2',6',6'-trimethylcyclohexene-(1')-yl-(1'))-2,4-dimethyl-1-ethoxy-hexatriene-(1,3,5). Boiling point (at 0.05 mm. Hg) 103° to 106° C.

*Example 7*

98 parts of beta-ionol and 165 parts of triphenylphosphine hydrobromide are suspended in 400 parts by volume of ethyl acetate and stirred at room temperature until a clear solution has resulted. The solvent is distilled off in vacuo and the frothy residue is suspended in 300 parts of anhydrous ether. A solution of 60 parts of ethyl magnesium bromide in 260 parts by volume of absolute ether is dripped in at 0° C. When it has all been added, stirring is continued for another hour at 0° C. and then a solution of 30 parts of glycol aldehyde in 100 parts by volume of absolute ether is added.

An exothermic reaction takes place. After stirring for 5 hours at 0° C., it is poured onto 200 parts by volume of a saturated aqueous ammonium chloride solution, turbined for 20 minutes and the ether layer then separated off By distillation there are obtained 22 parts of beta-ionylidene ethanol of the boiling point (at 0.01 mm. Hg) of 117° to 119° C.

*Example 8*

98 parts of beta-ionol are stirred with 165 parts of triphenylphosphine hydrobromide in 200 parts by volume of acetonitrile until clear solution has taken place. The solvent is then distilled off in vacuo and the residue suspended in 150 parts by volume of benzene. This suspension is stirred at room temperature into a suspension of finely divided sodamide (18 parts) in benzene. The whole is stirred at room temperature for another 48 hours and the dark colored solution filtered while excluding air and moisture. To the filtrate there is added dropwise a solution of 50 parts of glyoxylic acid ethyl ester in 80 parts by volume of absolute benzene. The whole is stirred for another 2 hours at room temperature and heated for another 4 hours at 60° C. It is then cooled, poured onto ice and excess 10% phosphoric acid. The benzene solution is separated, dried over sodium sulfate for 48 hours, filtered and the filtrate fractionally distilled. There are thus obtained 21 parts of beta-ionylidene acetic acid ethyl ester of the boiling point (at 0.03 mm. Hg) of 109° to 111° C. $\lambda_{max}$ (methanol) 301 to 302 millimicrons, $\epsilon=18,000$.

Example 9

98 parts of beta-ionol are stirred with 195 parts of triphenylphosphine hydroiodide (prepared from triphenylphosphine and hydroiodic acid) in 300 parts by volume of acetonitrile for 4 hours at +5° C. The acetonitrile is distilled off in vacuo and the residue dissolved in 200 parts of absolute tetrahydrofurane. A solution of 42 parts of lithium phenyl in 200 parts by volume of absolute ether is dripped in at 0° C. While cooling with ice, a solution of 55 parts of 4-methyl-hexadiene-(2,4)-al-(1) (See French patent specification No. 1,140,283) in 150 parts by volume of absolute tetrahydrofurane is added dropwise to the deep violet solution. It is stirred for 30 minutes at room temperature and poured onto ice and excess 10% sulfuric acid. The ether-tetrahydrofurane layer is separated, washed several times with water, with 10% sodium thiosulfate solution and again with water, dried over sodium sulfate and the solvent evaporated in vacuo. The residue is digested in 100 parts by volume of petroleum ether and filtered after standing for 12 hours at 0° C. The filtrate is fractionally distilled and 71 parts of axerophtene of the boiling point 132° to 135° C. and 0.005 mm. Hg are obtained.

The product obtained is a cis-trans isomer mixture from which the all-trans isomer crystallizes out upon standing at lowered temperature. The crystals are isolated by trituration with ice-cold methanol and recrystallized from acetonitrile. 24 parts of all-trans axerophtene are obtained having the melting point 76° C. $\lambda_{max}$ 325 millimicrons, $\epsilon=49,000$.

In rat tests, this axerophtene exhibits vitamin A activity (about 55% as compared with 100% for vitamin A).

Example 10

136 parts of triphenylphosphine are dissolved in 220 parts by volume of dimethylformamide and, after the addition of 98 parts of beta-ionol, stirred for 7 hours at room temperature. It is then cooled to −20° C. and a solution of 18 parts of hydrogen chloride gas in 100 parts of methanol (HCl content determined titrimetrically) is added. It is stirred for another hour at 0° C. and then 100 parts of 9-carboxy-4,8-dimethyl-nonatetraene-(2,4,-6,8)-al-(1) are added which has been prepared by saponification of its ethyl ester which is obtained in analogy to the process of the British patent specification No. 784,628 from 7-carbethoxy-2,6-dimethyl-heptatriene-(2,-4,6)-al-(1) by acetalization, addition of vinyl ethyl ether, deacetalization of the reaction product and splitting off of alcohol, and which is in the form of pale yellow needles of the melting point 169° C. Then a solution of 70 parts of sodium methylate in 240 parts of methanol is added, a vigorous exothermic reaction thereby taking place. It is stirred for another 25 minutes, 200 parts of isopropanol added and again cooled to 0° C. By acidification with 10% sulfuric acid until a Congo acid reaction is obtained, orange-red crystals are precipitated which are filtered off by suction after stirring for two hours. They are washed with water and dried under reduced pressure.

130 parts of 13-(2′,6′,6′-trimethyl-cyclohexene-(1′)-yl-(1′))-3,7,11 - trimethyl - tridecahexaene - (2,4,6,8,10,12)-acid-(1) (homo-isopreno-vitamin A acid) are obtained as orange needles from isopropanol, melting point 180° to 181° C. $\lambda_{max}$ (hexane) 408 millimicrons, $\epsilon=55,000$.

Example 11

136 parts of triphenylphosphine are dissolved in 220 parts by volume of dimethylformamide and stirred for 7 hours at room temperature after the addition of 98 parts of beta-ionol. It is then cooled to −20° C. and a solution of 18 parts of hydrogen chloride gas in 100 parts of methanol (HCl content titrimetrically determined) is added. It is stirred for another hour at +10° C. 30 parts of 4,9-dimethyldodecatetraene-(2,4,8,10)-ine-(6)-dial-(1,- 12) are then added and stirred until a clear solution has been formed. Without allowing it to cool, there is allowed to flow in fairly quickly a solution of 30 parts of sodium methylate in 120 parts of methanol. A vigorous exothermic reaction takes place. The whole is stirred for another 2 hours and then poured onto ice and excess 10% phosphoric acid. The 15,15′-dehydro-beta-carotene formed is extracted with benzene. The dark red benzene solution is washed with water, dried over sodium sulfate and the benzene evaporated off under reduced pressure until only a small residue is left. Then 200 parts of alcohol are added and allowed to stand for a long time at +5° C.; in this way there crystallize out 58 parts of a stereomeric mixture of 15,15′-dehydro-beta-carotenes (mainly the 9,9-di-cis isomer) of the melting point 74° to 86° C.—yellow-orange crystalline powder, $\lambda_{max}$ (in hexane) 431 to 433 millimicrons, $\epsilon=71,000$.

By repeated fractional crystallization from benzene/methanol there is obtained the pure all-trans 15,15′-dehydro-beta-carotene as brick red leaflets of the melting point 154° C., $\lambda_{max}$ (hexane) 432 to 433 millimicrons, $\epsilon=98,000$ and 457 millimicrons, $\epsilon=79,000$.

Example 12

150 parts of triphenylphosphine hydrochloride, 110 parts of trans-beta-ionylidene ethanol and 200 parts by volume of dimethylformamide are stirred for 12 hours at room temperature. The yellow solution is cooled to −10° C. and then 40 parts of tiglaldehyde and 87 parts of a 30% solution of sodium methylate in methanol are allowed to flow in simultaneously from separate reservoirs. The whole is stirred at room temperature for another 2 hours and 110 parts of 10% sulfuric acid added. The reaction product is extracted with petroleum ether. The petroleum ether extract is washed with water, dried with sodium sulfate at +5° C. for 12 hours and filtered. The filtrate is filtered through a column with aluminum oxide (activity 2 according to Brockmann), freed from petroleum ether by distillation and the residue distilled in a high vacuum. At the boiling point 135° to 140° C. at 0.005 mm. Hg there distil over 75 parts of axerophthene (de-oxy-vitamin A) (mainly in the all-trans form) which upon standing at lower temperature slowly crystallizes out and after recrystallization from acetonitrile has a melting point of 75° to 76° C., $\lambda_{max}$ 325 millimicrons, $\epsilon=50,000$ (methanol).

Example 13

110 parts of cis-beta-ionylidene ethanol and 180 parts of triphenylphosphine hydrobromide are stirred in 200 parts by volume of dimethylformamide for 6 hours at room temperature. It is cooled to −10° C. and 80 parts of beta-formylcrotonic acid ethyl ester added. While cooling well (the temperature must remain below 0° C.) 87 parts of a 30% solution of sodium methylate solution in methanol is allowed to flow in. It is stirred for another hour at +5° C. and the reaction mixture is poured onto ice and 10% phosphoric acid. After extraction with petroleum ether, the extract is washed neutral with water, dried with sodium sulfate and the petroleum ether evaporated in vacuo. To the residue are added 300 parts by volume of a 25% methanolic caustic potash solution and boiled under reflux under nitrogen for 60 minutes. The methanol is distilled off with steam and the residue acidified with 20% phosphoric acid until a Congo acid reaction is reached. A thick crystal pulp is thereby obtained which is filtered off by suction, washed with methanol and dried in vacuo. The crystals consists mainly of 9-cis-vitamin A acid, the yield being 92 parts. By recrystallization from methanol there is obtained the 9-cis vitamin A acid in pure state, fine pale yellow needles combined in clusters, melting point 189° C., $\lambda_{max}$ (methanol) 343 millimicrons, $\epsilon=37,000$.

Example 14

110 parts of trans-beta-ionylidene ethanol are stirred with 150 parts of triphenylphosphine hydrochloride in 200 parts by volume of acetonitrile until clear solution takes place. Then the acetonitrile is distilled off in vacuo and the frothy residue is dissolved in 200 parts by volume of methanol. 60 parts of beta-formylcrotonic acid (obtained by alkaline saponification of the diethyl acetal of beta-formylcrotonic acid ethyl ester and acid hydrolysis of the reaction product) are added and, while cooling to −15° C., a solution of 64 parts of potassium hydroxide in 300 parts by volume of methanol are allowed to flow in. It is stirred for another hour at room temperature and the reaction mixture is poured on ice and 10% phosphoric acid. It is extracted with ether, the red-yellow ethereal solution washed with water and shaken with 5% ammonia. The fawn brown ammoniacal solution is shaken several times with ether and then acidified with 10% sulfuric acid while cooling with ice, whereby vitamin A acid is precipitated partly in crystalline form. The precipitated acid is taken up in ether, the yellow ether solution washed with water, dried over sodium sulfate and the ether distilled off. The residue is digested with ice-cold methanol, and filtered by suction, 46 parts of vitamin A acid are obtained which by a single recrystallization from methanol has a melting point of 178° to 179° C., $\lambda_{max}$ 351 to 352 millimicrons, $\epsilon=40,000$ (methanol).

*Example 15*

220 parts of trans-beta-ionylidene ethanol are stirred with 300 parts of triphenylphosphine hydrochloride in 400 parts of dimethylformamide for 12 hours at +10° C. 174 parts of a 30% solution of sodium methylate in methanol are allowed to drip in from one stock vessel and, at the same time, a solution of 160 parts of gamma-acetoxy-alpha-methylcrotonaldehyde (boiling point 95° to 97° C. at 15 mm. Hg) in 110 parts of dimethyl-formamide from another stock vessel. The reaction solution is kept at −10° C. by cooling. It is stirred for another 5 hours at 0° C. and acidified with dilute phosphoric acid. The pale yellow oily suspension is then extracted with petroleum ether. The petroleum ether solution is washed with water, dried with sodium sulfate, filtered and the filtrate concentrated to a volume of about 400 parts by volume. This petroleum ether extract is filtered through an aluminum oxide column (activity 2 to 3 according to Brockmann). The filtrate is freed under nitrogen in vacuo from petroleum ether and in a short-path distillation plant at 70° C. and 0.0001 mm. Hg from low boiling constituents. The residue remaining amounts to 135 parts and has $\lambda_{max}$ 324 to 325 millimicrons, $\epsilon=36,000$ (isopropanol). The vitamin A acetate concentrate thus obtained can be further purified by chromatographic adsorption.

*Example 16*

110 parts of trans-beta-ionylidene ethanol are dissolved in 300 parts of dimethylformamide and, after the addition of 115 parts of triphenylphosphine hydrobromide, stirred for 24 hours at room temperature. 55 parts of alpha-methyl-acrolein are added and the clear solution cooled to −5° C. While stirring vigorously and cooling, 85 parts by volume of a 30% solution of sodium methylate in methanol are dripped in fairly quickly. It is stirred for another 3 hours at room temperature, 100 parts by volume of a 10% phosphoric acid added and the whole extracted with petroleum ether. The combined petroleum ether solutions are washed well several times with water and dried at −5° C. for 12 hours over sodium sulfate. After filtration, the whole is distilled. 82 parts of 8-(2',6',6'-trimethyl-cyclohexene-(1')-yl-(1'))-2,6-dimethyl-octatetraene-(1,3,5,7) are obtained of the boiling point 135° C. to 138° C. at 0.05 mm. Hg, $\lambda_{max}$ (hexane) 319 millimicrons, $\epsilon=44,000$; it is a pale yellow, very autoxidizable oil.

*Example 17*

220 parts of trans-beta-ionylidene ethanol and 265 parts of triphenylphosphine are dissolved in 500 parts of dimethylformamide and 36 parts of hydrogen chloride dissolved in 150 parts of methanol (HCl content determined titrimetrically) are added and stirred for 3 hours. A clear solution forms which, after the addition of 80 parts of ethyl formate, is cooled to 0° C. and 200 parts by volume of a 30% solution of sodium methylate in methanol are quickly added. The whole is stirred for another 12 hours at room temperature and then worked up in a manner analogous to that described in Example 16.

*Example 18*

170 parts of tritolylphosphine hydrochloride are added to 110 parts of trans-beta-ionylidene ethanol and, after the addition of 300 parts by volume of acetonitrile, stirred for 12 hours at room temperature. The solvent is then distilled off under reduced pressure and the residue dissolved in 250 parts by volume of methanol. 60 parts of alpha-methyl-beta-ethoxy-acrolein are added, cooled to 0° C. and a solution of 28 parts of sodium methylate in 90 parts by volume of methanol dripped in quickly. It is stirred for another 10 hours at room temperature, poured onto ice and extracted with petroleum ether. The pale yellow petroleum ether extract is washed with water, dried for 12 hours at 0° C. over sodium sulfate and, after filtration through a small column filled with aluminum oxide, freed from solvent in vacuo. The residue is distilled in a high vacuum. 91 parts of 8-(2',6',6'-trimethyl-cyclohexene-(1')-yl-(1'))-2,6-dimethyl-1-ethoxy-octatetraene-(1,3,5,7) of the boiling point 135° C. to 140° C. at 0.001 mm. Hg are obtained.

*Example 19*

110 parts of trans-beta-ionylidene ethanol are dissolved in 250 parts by volume of dimethylformamide and, after the addition of 150 parts of triphenylphosphine hydrochloride, stirred for 8 hours at room temperature. It is cooled to 0° C. and there are dripped in simultaneously from separate stock vessels while stirring a solution of 60 parts of potassium tertiary butylate dissolved in 450 parts of tertiary butanol and 60 parts of beta-formylcrotonic acid butyl ester (boiling point 110° C. at 15 mm. Hg) dissolved in 130 parts of dimethylformamide. It is stirred for another 10 hours at room temperature. The reaction mixture is poured onto ice and 10% phosphoric acid and extracted with petroleum ether. The extract is washed with water and dried over sodium sulfate. The petroleum ether and tertiary butanol are then distilled off in vacuo and the residue dissolved again in petroleum ether. The petroleum ether solution is filtered through a column filled with 500 parts of aluminum oxide (according to Brockmann). The filtrate is distilled. 82 parts of vitamin A acid butyl ester are obtained having the boiling point 165° C. to 170° C. at 0.001 mm. Hg, $\lambda_{max}$ 351 to 352 millimicrons, $\epsilon=35,000$.

*Example 20*

180 parts by volume of a 1,4-normal methanolic sulfuric acid are added at +5° C. while stirring to 55 parts of trans-beta-ionylidene ethanol and 60 parts of triphenylphosphine. The mixture is stirred at room temperature for 24 hours. After cooling to 0° C. there are then added 35 parts of beta-formylcrotonic acid methyl ester and 240 parts by volume of a 3-normal methanolic ammonia solution are dripped in. The whole is stirred for another 20 hours at room temperature and the reaction product is extracted with petroleum ether. The petroleum ether extract is washed with water, dried over sodium sulfate and the solvent distilled off in vacuo. The residue has $\lambda_{max}$ 352 to 353 millimicrons, $\epsilon=21,000$ (47 parts) and consists of crude vitamin A acid methyl ester.

Example 21

110 parts of trans-beta-ionylidene ethanol are dissolved in 120 parts by volume of methanol and, after the addition of 102 parts of triphenylphosphine, stirred for 5 hours at room temperature. Then 300 parts by volume of a 1,3-normal methanolic solution of para-toluenesulfonic acid are dripped in at +10° C. The whole is stirred for another 16 hours at room temperature, 48 parts of beta-formylcrotonic acid methyl ester are added and then 35 parts of piperidine. Exothermic reaction takes place and when it has ceased the whole is stirred for another 8 hours at room temperature. 90 parts of water are added to the reaction mixture which is then exhaustively extracted with petroleum ether. After the usual working up there are obtained 48 parts of vitamin A acid methyl ester.

Example 22

110 parts of trans-beta-ionylidene ethanol are mixed with 115 parts of triphenylphosphine hydrobromide and, after the addition of 250 parts of methanol, stirred for 36 hours at room temperature. Then 90 parts of 7-carboxy-2,6-dimethylheptatriene-(2,4,6)-al-(1) (obtained by saponification of the ethyl ester, melting point 193° C. to 194° C. obtainable according to British patent specification No. 784,628) are added and the whole stirred until a clear solution has been formed. It is then cooled to −20° C. and a solution of 40 parts of sodium hydroxide in 200 parts of methanol is dripped in quickly while stirring vigorously and while cooling. A vigorous exothermic reaction occurs and the temperature rises to +30° C. The dark solution is stirred for another 15 minutes at room temperature, again cooled to −10° C. and neutralized with 10% sulfuric acid to a Congo acid reaction. Fine pale orange crystals of 13-(2',6',6'-trimethylcyclohexene-(1') - yl - (1'')) - 3,7,11-trimethyl-tridecahexaene-(2,4,6,8,10,12)-acid-(1) (homo-isopreno-vitamin A acid) form. They are filtered off, washed with water and recrystallized from isopropanol. 105 parts of homo-isopreno-vitamin A acid are obtained in the form of orange-red needles of the melting point 187° C. to 188° C., $\lambda_{max}$ (cyclohexane) 408 millimicrons, $\epsilon$=65,000.

Example 23

110 parts of trans-beta-ionylidene ethanol and 150 parts of triphenylphosphine hydrochloride are stirred in 250 parts by volume of acetonitrile until a clear solution has formed. Then the acetonitrile is distilled off in vacuo and the residue dissolved in 250 parts by volume of dimethylformamide. 24 parts of sodium acetylide are added and the whole stirred for 48 hours at −5° C. Then a solution of 28 parts of all-trans-2,7-dimethyl-octatriene-(2,4,6)-dial-(1,8) in 300 parts by volume of dimethylformamide is dripped in rapidly and the reaction solution heated to 50° C. for 20 minutes. It is neutralized by the addition of a few drops of glacial acetic acid, 500 parts by volume of ethanol are added and the whole stirred for 12 hours at room temperature. The pale red precipitate is filtered off by suction and recrystallized from benzene/alcohol. There are thus obtained 37 parts of all-trans-beta-carotene of the melting point 179° C. to 180° C., $\lambda_{max}$ (hexane) 442 millimicrons ($\epsilon$=148,000) and 481 millimicrons ($\epsilon$=136,000).

Example 24

136 parts of triphenylphosphine hydrobromide, 88 parts of trans-beta-ionylidene ethanol and 300 parts of dimethylformamide are stirred for 3 hours at 0° C. and for 12 hours at room temperature. After adding 25 parts of 2,7-dimethyl-octadiene-(2,6)-ine-(4)-dial-(1,8), there are quickly introduced while stirring vigorously 110 parts by volume of a 30% solution of sodium methylate in methanol. When the exothermic reaction has ceased, the whole is stirred for another 2 hours, a few drops of glacial acetic acid are added and, after the addition of a mixture of ethanol and methanol in the ratio 1:3 (500 parts by volume), the whole is allowed to stand for 5 hours at 0° C. The precipitate which has been thrown down is filtered off by suction and recrystallized from a mixture of benzene and methanol. There are obtained 38 parts of 15,15'-dehydro-beta-carotene in the form of vermilion leaflets of the melting point 154° C., $\lambda_{max}$ (hexane) 433 to 434 millimicrons, $\epsilon$=113,000; 457 to 458 millimicrons, $\epsilon$=92,000.

Example 25

30 parts of beta-cyclogeraniol are dissolved in 250 parts by volume of dimethylformamide and 70 parts of triphenylphosphine hydrobromide added. After stirring for 12 hours at room temperature, 12 parts of 2,6,11,15-tetramethyl - hexa - decaheptaene-(2,4,6,8,10,12,14)-dial-(1,16) are added and the mixture stirred until clear solution has taken place. Without cooling there are then added 37 parts by volume of a 30% solution of sodium methylate in methanol. The whole is stirred for another hour at room temperature and adjusted to the pH value 7 with acetic acid. After stirring for an hour at 0° C., the beta-carotene is completely precipitated with 250 parts by volume of methanol and then filtered off by suction. There are obtained 11 parts of all-trans-beta-carotene; after a single dissolution in and reprecipitation from a mixture of benzene and methanol it is melting point pure; the melting point is 179° C. to 180° C., $\lambda_{max}$ (cyclohexane) 454 millimicrons and 482 millimicrons.

Example 26

26 parts of 8-(2',6',6'-trimethyl-cyclohexene-(1')-yl-(1'')) - 6 - methyl - octatriene - (3,5,7) - ol - (2) (H. H. Inhoffen, F., and M. Bohlmann, Liebigs Ann. Chem. 565 (1949), page 35) with 27 parts of triphenylphosphine hydrochloride are stirred in 100 parts by volume of acetonitrile for 2 hours at room temperature. The acetonitrile is then distilled off, 100 parts by volume of dimethylformamide and 14 parts of 4-methyl-1-al-hexadiene-(2,4)-acid-(6) dissolved in 30 parts by volume of isopropanol are added. While stirring vigorously, a solution of 17 parts of sodium ethylate in 80 parts by volume of ethanol are added. The whole is stirred for another hour and 10% sulfuric acid is added until a Congo acid reaction. After standing overnight, it is filtered by suction and the precipitate is washed with water and recrystallized from isopropanol. There are obtained 14 parts of 13 - (2',6',6' - trimethyl - cyclohexene - (1')-yl - (1'')) - 3,7,11 - trimethyl - tridecahexaene - (2,4,6,8,10,12) - acid - (1) (homo - isopreno - vitamin A acid) in the form of fine orange-red needles (after recrystallization from isopropanol); melting point 188° C. to 189° C., $\lambda_{max}$ (hexane) 400 millimicrons, $\epsilon$=65,000.

Example 27

36 parts of triphenylphosphine hydrochloride are slowly introduced into a solution, cooled to 0° C., of 30 parts of vitamin A alcohol in 150 parts of dimethylformamide; the mixture is stirred at 0° C. until—after about 8 hours—a clear yellow-red solution has formed. From two separate stock vessels there are then introduced slowly within the course of 30 minutes simultaneously a solution of 14 parts of beta-formylcrotonic acid ethyl ester in 50 parts by volume of dimethylformamide and an about 30% solution of 8 parts of sodium methylate in methanol. The whole is stirred for another 3 hours at 0° C. and for another hour at room temperature, then covered with petroleum ether and 10% sulfuric acid is introduced until an acid reaction results. After thoroughly mixing through, the orange-yellow petroleum ether solution is separated and the remainder shaken twice with petroleum ether. The combined petroleum ether extracts are washed with water, dried over sodium sulfate and evaporated to dryness in vacuo. An orange-red oil is obtained which crystallizes partly on the addition of some isopropanol. The crystals are recrystallized from isopropanol. There are obtained 17 parts of 13-(2',6',6'-trimethyl - cyclohexene - (1') - yl - (1')) - 3,7,11 - trimethyl - tridecahexaene - (2,4,6,8,10,12) - acid - (1) ethyl ester (homo-isopreno-vitamin A acid ethyl ester) in the form of brilliant orange-red leaflets of the melting point 111° C.; $\lambda_{max}$ (methanol) 399 millimicrons, $\epsilon=73,000$.

With antimony trichloride in chloroform, it shows a green color reaction which slowly changes to blue.

*Example 28*

A solution of 3.6 parts of hydrogen chloride gas in 40 parts by volume of methanol (HCl content determined titrimetrically) is slowly dripped into a solution, kept at 0° C., of 30 parts of vitamin A alcohol and 26 parts of triphenylphosphine in 100 parts by volume of dimethylformamide. The whole is stirred for another 12 hours at +5° C. and there are added 10 parts of trans-beta-formylcrotonic acid (melting point 66° C. obtained by alkaline saponification of the diethyl acetal of formylcrotonic acid ethyl ester and deacetalization of the reaction product). The whole is cooled to —5° C. and an about 30% solution of 20 parts of sodium methylate in methanol added quickly. A vigorous exothermic reaction takes place. The whole is stirred for another 15 minutes at room temperature, 40 parts by volume of isopropanol added and acidified with 10% sulfuric acid to a Congo acid reaction. The whole is stirred for another 2 hours at room temperature and the deposited orange-red crystals are worked up. There are obtained 13 parts of 13-(2',6',6' - trimethyl - cyclohexene - (1') - yl - (1')) - 3,7,11 - trimethyl - tridecahexaene - (2,4,6,8,10,12)-acid-(1) (homo-isopreno-vitamin A acid) in the form of fine orange-red needles (after recrystallization from isopropanol) of the melting point 188° C. to 189° C., $\lambda_{max}$ (hexane) 400 millimicrons, $\epsilon=65,000$.

*Example 29*

75 parts of vitamin A alcohol and 90 parts of triphenylphosphine are stirred with 100 parts by volume of anhydrous ethanol under nitrogen. 70 parts by volume of a 5-normal alcoholic hydrochloric acid are then dripped in slowly at room temperature. The whole is stirred for 24 hours and the resulting solution is dripped simultaneously with 90 parts by volume of a 4-normal alcoholic caustic potash solution into a solution of 60 parts of vitamin A aldehyde in 60 parts by volume of anhydrous ethanol. The temperature is kept at 0° C. by cooling. After stirring for 2 hours, the deep red precipitate formed is filtered off. The filtrate is extracted with water after the addition of 40 parts by volume of water. The filter residue dissolved in benzene is combined with the deep red extract. For the recovery of the end product, the mixture is washed with water, dried over sodium sulfate and evaporated to dryness. From the crude product, by dissolution in 600 parts by volume of hot benzene and precipitation with 1200 parts by volume of ethanol, all-trans beta-carotene crystallizes out; melting point 177° C. to 178° C., $\lambda_{max}$ (hexane) 452 millimicrons, $\epsilon=147,000$) and 481 millimicrons ($\epsilon=134,000$); yield 97 parts.

*Example 30*

108 parts of beta-ionol and 165 parts of triphenyl phosphine hydrochloride are suspended in 100 parts of acetonitrile. Stirring is continued for an hour until the whole has dissolved, the heat of reaction being withdrawn so that a temperature of 50° C. is not exceeded. The acetonitrile is then distilled off in vacuo at a maximum bath temperature of 50° C. and the frothy residue is dissolved in 130 parts of dimethylformamide. After adding 62.5 parts of 4-methyl-hexadiene-(2,4)-al-(1)-acid-(6) (melting point 177° C., white needles, $\lambda_{max}$ in methanol=274 millimicrons, $\epsilon=28,000$), there are rapidly added, while cooling with ice, 200 parts of a 30% solution of sodium methylate in methanol. The reaction is strongly exothermic. The whole is stirred for 30 minutes, then the methanol and dimethylformamide are partly distilled off in vacuo (maximum bath temperature 65° C.), 80 parts of alcohol and 100 parts of 10% sulphuric acid are added to the residue while stirring, the whole stirred for another 3 hours at 0° C. and the deposited vitamin A acid filtered off by suction. After washing with 30 parts of ice-cold methanol and about 300 parts of ice-water, the vitamin A acid is dried in vacuo at 40° C. The yield amounts to 100 parts.

The product obtained is a 9.10-cis.trans-isomer mixture of vitamin A acid having the melting point 156° C. ($\lambda_{max}$ in methanol=347 to 349 millimicrons, $\epsilon=41,000$). By esterification there is obtained therefrom for example the methyl ester in almost a quantitative yield, partial rearrangement into the all-trans-form taking place. The all-trans-methyl ester, after recrystallization from acetonitrile, forms yellow needles of the melting point 58° C. ($\lambda_{max}$ in methanol=353 millimicrons, $\epsilon=46,000$).

*Example 31*

54 parts of beta-ionol and 80 parts of triphenyl phosphine hydrobromide are suspended in 200 parts of 2.5-dimethyl-tetrahydrofurane and stirred for 6 hours. It is then distilled at a separator until no further water passes over azeotropically, 50 parts of dimethylformamide and 31 parts of 4-methyl-hexadiene-(2.4)-al-(1)-acid-(6) are added and, while cooling with ice and stirring, 100 parts of a 30% solution of sodium methylate in methanol are gradually allowed to flow in. After 40 minutes, the 2.5-dimethyl-tetrahydrofurane is substantially distilled off in vacuo and about 500 parts of 10% sulphuric acid added to the residue. The brown-yellow, partly crystalline, milky solution is extracted with ether and the deep yellow ethereal solution washed with water and shaken with a 5% ammonia solution. The brown ammonia solution is washed with ether and then acidified with 10% sulphuric acid, the vitamin A acid thereby being precipitated in crystalline form. It is isolated as in Example 1 and recrystallized from cyclohexane. The yield amounts to 43 parts.

*Example 32*

108 parts of beta-ionol and 165 parts of triphenylphosphine hydrochloride are dissolved in 150 parts of dimethylformamide and stirred for 6 hours at room temperature. Then 62.5 parts of 4-methyl-hexadiene-(2.4)-al-(1)-acid-(6) dissolved in 50 parts of isopropanol are added and, while cooling to —5° C., 55 parts of sodium hydroxide dissolved in 150 parts of methanol are dripped in fairly rapidly. The reaction is exothermic and cooling is applied so that +15° C. is not exceeded. The whole is then stirred for another 30 minutes at room temperature, about 100 parts of isopropanol are introduced and while cooling to 0° to +5° C. the product is acidified with 10% sulfuric acid until a reaction acid to Congo is obtained. Vitamin A acid is thereby precipitated in crystalline form. It is filtered off by suction and further isolated as described in Example 1. The yield amounts to 86 parts.

*Example 33*

108 parts of beta-ionol and 165 parts of triphenylphosphine hydrochloride are dissolved in 150 parts of dimethylformamide and stirred for 6 hours at room temperature. Then 62.5 parts of 4-methyl-hexadiene-(2.4)-al-(1)-acid-(6) dissolved in 50 parts of ethanol are added and, while cooling to —10° C., 80 parts of potassium hydroxide dissolved in 200 parts of ethanol are dripped in fairly rapidly. The reaction is strongly exothermic and cooling is applied so that 15° C. is not exceeded. The whole is then stirred for another 30 minutes at room temperature and alcoholic hydrochloric acid is added until the reaction is neutral; then a few drops of ammonia are added and the ethanol evaporated off in vacuo. The pasty residue has 300 parts of isopropanol added to it and it is made acid to Congo by the addition of 10% aqueous hydrochloric acid, whereby vitamin A acid crystallizes out.

The yield amounts to 91 parts.

We claim:

1. A process for the production of compounds containing the beta-cyclogeranylidene radical in which the oxygen of the carbonyl group belonging to a compound selected from the group consisting of aldehydes, ketones and formic acid esters is replaced by a group characterized by the formula (I) 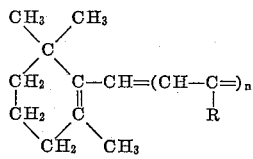

which comprises condensing (A) the reaction product of (a) a compound of the formula (II) 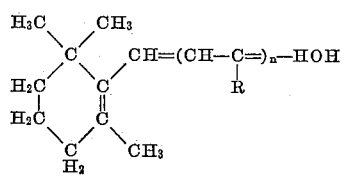

wherein $n$ in the above formulae represents one of the figures 0, 1, 2, 3 and 4 and R is selected from the group consisting of H and —$CH_3$, and (b) a triarylphosphine selected from the group consisting of triphenyl phosphine and a lower alkyl substituted triphenyl phosphine and (c) a proton donor not exerting an oxidizing action and not exerting a reducing action during the condensation, said proton donor being selected from the group consisting of a strong inorganic acid and a strong organic acid with (B) said compound bearing a carbonyl group and with (C) a proton acceptor as an acid binding agent said proton acceptor being selected from the group consisting of an inorganic base, an organic base, and an organo-metallic compound whereby a condensation product is formed containing said beta-cyclogeranylidene radical.

2. A process for the production of compounds bearing the cyclogeranylidene radical which comprises reacting (a) a compound of the general formula (II) 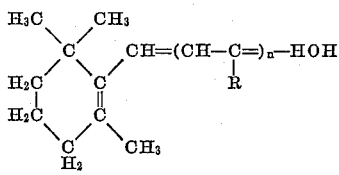

wherein $n$ represents one of the figures 0, 1, 2, 3 and 4 and R is $CH_3$ in odd numbered groups

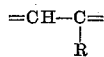

and R is H in even numbered groups

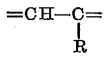

counted beginning from the cyclic radical in the general formula, with (b) a triarylphosphine selected from the group consisting of triphenyl phosphine and a lower alkyl substituted triphenyl phosphine and (c) a proton donor not exerting an oxidizing action and not exerting a reducing action during the reaction and being selected from the group consisting of a strong inorganic acid and a strong organic acid with a proton acceptor as an acid-binding agent which may split off hydrogen halide from a triaryl-phosphonium halide and which is selected from the group consisting of an inorganic base, an organic base and an organo-metallic compound, and finally with a compound selected from the group consisting of aldehydes, ketones and formic acid esters.

3. The process as claimed in claim 1 wherein the compound of Formula II, the triarylphosphine and the proton donor are combined in the presence of the carbonyl compound and then the proton acceptor is added.

4. The process as claimed in claim 1 wherein the carbonyl compound is added after the proton acceptor has been added.

5. The process as claimed in claim 1 wherein the triarylphosphine and the proton donor are combined in the form of a hydrosalt of the triarylphosphine.

6. The process as claimed in claim 1 wherein the compound of the Formula II is

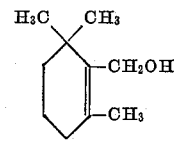

7. The process as claimed in claim 1 wherein the compound of the Formula II is

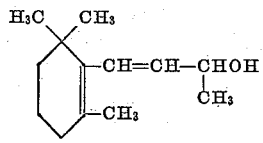

8. The process as claimed in claim 1 wherein the compound of the Formula II is

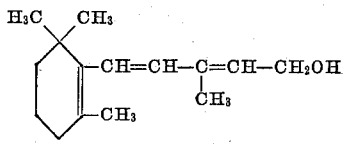

9. The process as claimed in claim 1 wherein the compound of the Formula II is

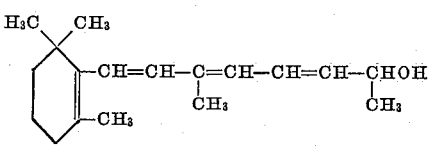

10. The process as claimed in claim 1 wherein the compound of the Formula II is

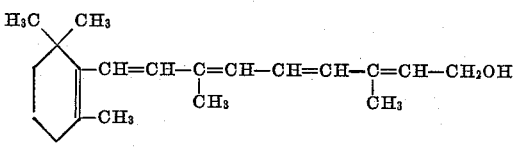

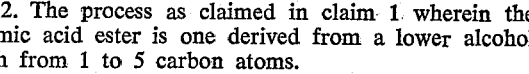

11. The process as claimed in claim 1 wherein the aldehyde is an aliphatic dialdehyde.

12. The process as claimed in claim 1 wherein the formic acid ester is one derived from a lower alcohol with from 1 to 5 carbon atoms.

13. The process as claimed in claim 1 which comprises carrying out the reaction in the presence of a highly polar solvent, selected from the class consisting of dimethyl formamide, acetonitrile, methanol, acetic esters and nitrobenzene.

14. The process as claimed in claim 1 which comprises carrying out the reaction at a temperature between minus 20° C. and plus 30° C.

15. The process for manufacturing salts of vitamin A acid which comprises allowing to react with each other by bringing together in about equimolar amounts beta-ionol and a hydrohalide of a triarylphosphine selected from the group consisting of triphenyl phosphine and a lower alkyl substituted triphenyl phosphine in an organic liquid which is inert toward the reactants, then adding about equimolar amounts of 4-methylhexadiene-(2,4)-al-(1)-acid-(6) and about at least two equivalents of a proton acceptor as an acid-binding agent which may split off hydrogen halide from a triarylphosphonium halide and which is selected from the group consisting of an inorganic base, an organic base and an organo-metallic compound and removing the triarylphosphine oxide from the reaction mixture thus obtained.

References Cited in the file of this patent

UNITED STATES PATENTS

| | | |
|---|---|---|
| 2,917,523 | Pommer et al. | Dec. 15, 1959 |
| 2,917,524 | Pommer et al. | Dec. 15, 1959 |